(12) United States Patent
Thevenet et al.

(10) Patent No.: US 10,095,802 B2
(45) Date of Patent: Oct. 9, 2018

(54) METHODS AND SYSTEMS FOR USING FIELD CHARACTERISTICS TO INDEX, SEARCH FOR, AND RETRIEVE FORMS

(71) Applicant: Adobe Systems Incorporated, San Jose, CA (US)

(72) Inventors: Frederic Thevenet, San Francisco, CA (US); Priyank Mathur, San Jose, CA (US); Shawn Gaither, Raleigh, NC (US); Rudi Sherry, San Jose, CA (US); Steve Dakin, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 507 days.

(21) Appl. No.: 14/734,441

(22) Filed: Jun. 9, 2015

(65) Prior Publication Data

US 2016/0364458 A1 Dec. 15, 2016

(51) Int. Cl.
*G06F 17/00* (2006.01)
*G06F 17/30* (2006.01)

(52) U.S. Cl.
CPC .............. *G06F 17/30899* (2013.01)

(58) Field of Classification Search
CPC ......... G06F 17/30899; G06F 17/30926; G06F 17/243
See application file for complete search history.

(56) References Cited

U.S. PATENT DOCUMENTS

| | | | |
|---|---|---|---|
| 6,442,576 B1 * | 8/2002 | Edelman | G06F 17/24 715/200 |
| 7,644,375 B1 * | 1/2010 | Anderson | G06F 17/30864 702/182 |
| 7,769,739 B1 * | 8/2010 | Soni | G06F 17/30126 707/705 |
| 8,539,004 B2 * | 9/2013 | Foygel | G06Q 10/10 707/608 |
| 8,620,953 B2 * | 12/2013 | Foygel | G06F 17/30011 707/770 |
| 8,660,356 B2 * | 2/2014 | Fisher | G06K 9/3208 382/181 |
| 2006/0256392 A1 * | 11/2006 | Van Hoof | H04N 1/00209 358/402 |
| 2010/0172590 A1 * | 7/2010 | Foehr | H04N 1/00326 382/217 |
| 2013/0205188 A1 * | 8/2013 | Lunde | H04L 67/42 715/224 |
| 2015/0242536 A1 * | 8/2015 | Surkov | G06F 17/3064 707/706 |
| 2015/0254366 A1 * | 9/2015 | Ravagnani | G06F 17/30569 709/204 |
| 2016/0275454 A1 * | 9/2016 | Shiryaev | G06F 17/243 |
| 2016/0277386 A1 * | 9/2016 | Boss | G06F 17/243 |

* cited by examiner

*Primary Examiner* — Cheryl Lewis
(74) *Attorney, Agent, or Firm* — Kilpatrick Townsend & Stockton LLP

(57) ABSTRACT

Systems and methods disclosed herein provide form search results in response to form-specific search criteria. One embodiment involves receiving, at an electronic form search server, input providing form-specific search criteria comprising one or more field characteristics. The embodiment further involves identifying, by the electronic form search server, one or more forms as search results based on form-specific search criteria. The embodiment further involves providing, by the electronic form search server, the search results.

21 Claims, 5 Drawing Sheets

METHODS AND SYSTEMS FOR USING FIELD CHARACTERISTICS TO INDEX, SEARCH FOR, AND RETRIEVE FORMS

TECHNICAL FIELD

This disclosure relates generally to computer-implemented methods and systems and more particularly relates to improving the efficiency and effectiveness of computing systems used in searching for and using forms.

BACKGROUND

Web search engines provide search tools for entering text strings to search for documents on the Internet. Such text-based search tools are not well suited for finding forms for various reasons. Many forms include common textual content. For example, there are many forms related to the text "youth soccer league application" with similar text on the forms, e.g., "child's name," "address." "birthdate." etc. As a result of this similar content amongst forms, searching for a particular form using text can be time consuming and burdensome for a user. Such a user may be required to try multiple search text strings and/or search through many similar results to find the particular form of interest. Moreover, the person searching for the particular form may view a given search result and have uncertainty as to whether it is the exact right form for which he or she is searching. Text-based document searching techniques do not provide an efficient and effective way to search for forms.

SUMMARY

Systems and methods disclosed herein provide form search results in response to form-specific search criteria. One embodiment involves storing, at an electronic form search server, field characteristics of a plurality of forms. The embodiment further involves receiving input providing form-specific search criteria comprising field characteristics. The embodiment further involves using the field characteristics of the form-specific search criterial to identify one or more forms from the plurality of forms as search results based on the one or more forms identified as search results having field characteristics similar to the field characteristics of the form-specific search criteria. The embodiment further involves providing the search results.

Another embodiment provides suggestions for a substitution for an input form. The embodiment involves receiving at least a portion of an input form and using image recognition to identify one or more fields on the input form. The embodiment further involves identifying a live form corresponding to the input form by searching using one or more field characteristics of the input form. The embodiment further involves, based on identifying a live field in the live form, recommending changing a non-live field in the input form to correspond to the live field.

These illustrative embodiments and features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
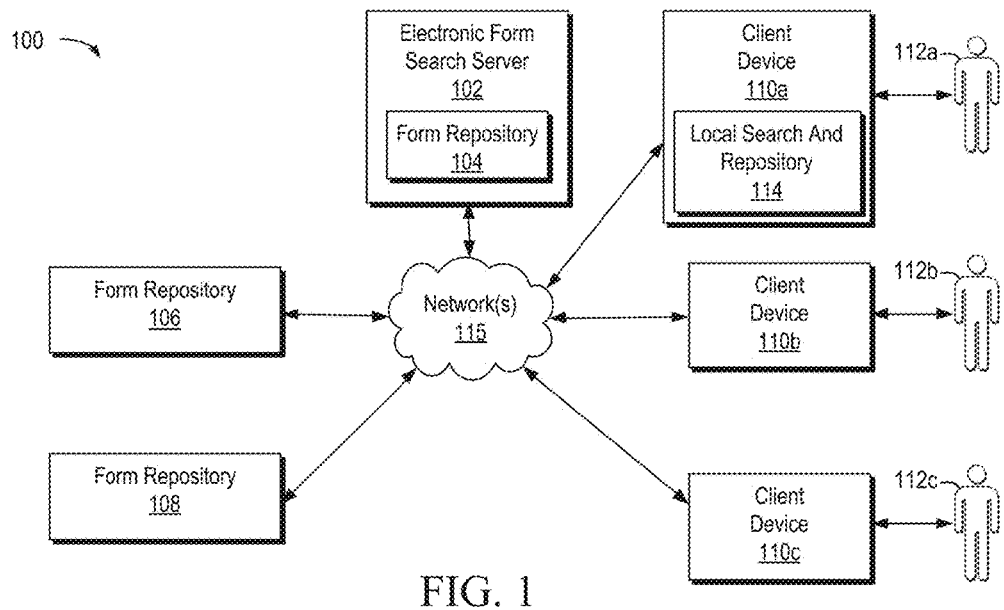
FIG. 1 is a block diagram depicting an example of a system for using form specific information to provide form searching and recommendation services using an electronic form search server.

As described above, text-based document searching techniques do not provide an efficient and effective way to search for forms. More efficient and effective ways to search for and use forms are provided by using form-specific search criteria in addition to text-based search criteria. In particular, the characteristics of the fields on forms including, but not limited to, the locations, boundary dimensions, information types, input types, labels, and other characteristics of the fields can be tracked and then used as search criteria. In one example, the number of fields provides searchable criteria, e.g., the number of fields in each of the forms in a search repository is identified and searching of the repository can use the number of fields to find appropriate search results, e.g., identifying only search results that include exactly 30 fields, etc. In another example, the layout of the fields provides alternative or additional search criteria, e.g., the relative positions of the fields of each form is identified and searching the repository uses that field layout as a search criteria to find appropriate search results.

Using field or other form-specific characteristics as search criteria also provides benefits to the person searching. In one embodiment, the searcher uses a scan of a paper form (or only a portion of paper form) to initiate as search. For example, a parent may take a picture of the first page of the "Mountain View Youth Recreation Application" paper form that he received in the mail, submit the scan as input into a search, and receive search results that include one or more electronic versions of the form. In this example, the person searching saves time and effort by not having to manually identify which of the information on the field is unique enough information for a text search and by not having to type such information into a text-search interface.

The use of field or other form-specific characteristics as search criteria makes it easier (and feasible in some cases) for a person searching to find a particular form, a cleaner or otherwise better version of a form, a newer or current version of a form, a live version of a form with live fields (i.e., with fields coded with dropdowns choices, coded as electronic checkboxes or other Boolean options, etc.), completed or blank versions of a form, etc. The use of form-specific search criteria also improves search results where the field characteristics provide a more unique fingerprint for a given form than the text of the form.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

As used herein, the phrase "form" refers to a paper or electronic document that is structured for completion by someone filling out the document with information that is expected to be put at specific places on the document. Typically, a form includes a template of fields and additional information added by one or more persons completing the form. A form will generally provide a way for the persons entering information to enter information in a consistent way so that a receiver of the multiple instances of the completed form can read or extract information at particular locations on the form and understand, based on the location, the information. Similarly, the use of fields at particular locations on forms facilitates the automatic interpretation of information entered onto the forms. A form may, for example, have a name field and a recipient or analysis application may understand based on the location of the text added to the form by a person completing the form that the added text is the name of the person. The template of a form can specify fields and field characteristics.

As used herein, the phrase "field" refers to a location in a form or a portion of a form at which one or more items of information are entered when the form is completed. A field has one or more field characteristics. Text boxes, Boolean graphics such as checkboxes, and signatures are examples of fields.

As used herein the phrase "field characteristic" refers to features of a field that identify where the field is located, what information the field should contain, what type of data should be input into the field, etc. Examples of field characteristics include, but are not limited to, field location, field boundary, field label, field input type, field information type, etc. A field label is text that is displayed on or near the field to graphically identify the type of information of the field. A field boundary is an invisible or visual representation of the bounds of the field. A field input type defines what type of user input changes the information entered into the field (e.g., text entry, drop down choices, check box, radio button, Boolean input, image, etc.). A field information type identifies the subject matter of the field (e.g., "first name" field, "address" field, "VIN" field, etc.). The characteristics of a field may be manually, semi-automatically, or automatically detected on a form. Characteristics of each field may be stored as metadata as part of a form and/or separate from a form.

Referring now to the drawings, FIG. 1 is a block diagram depicting an example of a system for using form specific information to provide form searching and recommendation services using an electronic form search server 102. Individuals 112a-c use client devices 112a-c to access the electronic form search service features through network 115. In one example, client device 110a accesses electronic form search server 102 and receives an hyper-text-markup-language (HTML) page or other web page file(s). A search interface is displayed in a web browser on client device 110a. In this example, the individual 112a uploads an image of a paper form into the search interface and submits a request that is sent from client device 110a to electronic from search server 102.

The electronic form search server 102 processes the search input (e.g., using image recognition, etc.) to identify one or more fields in the input image. Characteristics of the fields are also identified including, but not limited to, each fields location, input type, information type, bounds, label, etc. The electronic form search server uses the characteristics of the fields as form-specific search criteria to search a repository for matching forms. Forms with similar characteristics are identified as search results and the search results are provided from the electronic form search server to the client device 110a, where they are displayed in the user interface for selection and use by individual 112a.

The repository or repositories that are searched by electronic form search server 102 can be on the electronic form search server 102, such as in form repository 104. Additionally or alternatively, electronic form search server 102 may search a remote network location, for example, using network 115 to access form repositories 106, 108 located on separate servers and/or using network 115 to access a form repository located on the client devices 110a-c themselves. The search interface can receive input identifying which of a plurality of repositories should be searched in a particular search. Forms stored in the repository or repositories can be indexed in a database using the field characteristics of the forms.

Form processing and search features can additionally or alternatively be provided locally on the client device 110a. For example, client device 110a, as illustrated, maintains its own local form search and repository 114. Local search and repository 114 in this example comprises a standalone application providing user interface, form processing, and form search functionality and a memory storing a repository of forms that are searched by the application.

The search functionality provided by the electronic form search server 102 or form search and repository 114 searches using form-specific criteria that includes field characteristics. In one example, a scan of an image of an input form is used to identify field characteristics to use as search criteria. For example, a layout of the fields on the first page of the form may be used to search for forms in a repository with a matching (or similar) layout.

The characteristics of an input field can be used alone or in combination with one another as search criteria. The location of a field on a page (located by scanning or already known based on the form's metadata), the locations of some or all the fields with respect to each other (i.e., the field layout), the information type of those fields, the labels of those fields, and other field characteristics can alone or in combination with one another form a unique pattern or fingerprint for a form that can be used to improve searching for matching or similar forms. Searching can use a form space in which forms similarity can be assessed. A search can find all forms that are within a threshold distance of an input form in field space, where the distance represents similarity of the form characteristics.

By searching using field characteristics, matching forms and similar forms can be identified more precisely, more quickly, and in a way that requires less search time and effort on the part of the person searching. The person searching is also able to find a cleaner version of a form when desired, e.g., a version without writing or copy artifacts. Similarly, a person searching is able to find a live version of a form or receive recommendations for how fields should be coded to be live based on live fields in corresponding live forms. Additionally, a person searching is able to find an electronic version of a paper form. A person searching may be better able to utilize the efforts of others who have previously used the same form. For example, one user may correct a form by adjusting one or more of the fields to be more accurate. Similarly, a form may be automatically corrected based on analysis of actions of persons filling out a form (e.g., identifying that an identified check box field is not actually a field based on none of the millions of form fillers ever having checked the check box). However a form is corrected, another user can search using an uncorrected version of the form and identify and use the corrected version of the form without having to correct the form himself.

Searching using field characteristics that are derivable from the forms themselves also enables searching on phones, tablets, and other small devices. For example, rather than entering text describing a form search, a user is able to take a quick picture of first page and receive an electronic version of the complete document. Searching using field characteristics also accommodates users with disabilities by allowing such users to find versions of form with structured content, live fields, and other helpful additional material.

Figure 2:
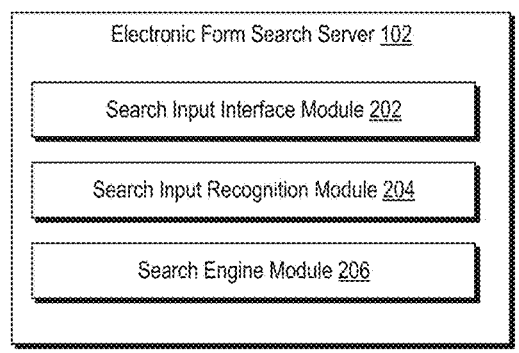
FIG. 2 is a block diagram illustrating exemplary modules for implementing functions in electronic form search server FIG. 1.
Figure 4:
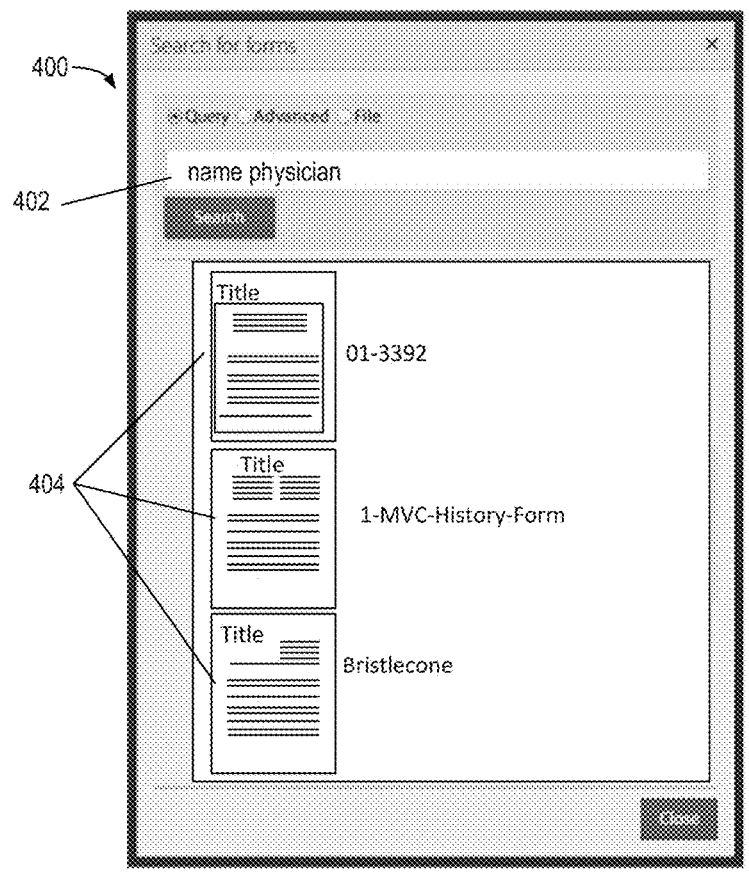
FIGS. 4-6 illustrate exemplary interfaces for receiving input used to identify field characteristics used as search criteria.
Figure 5:
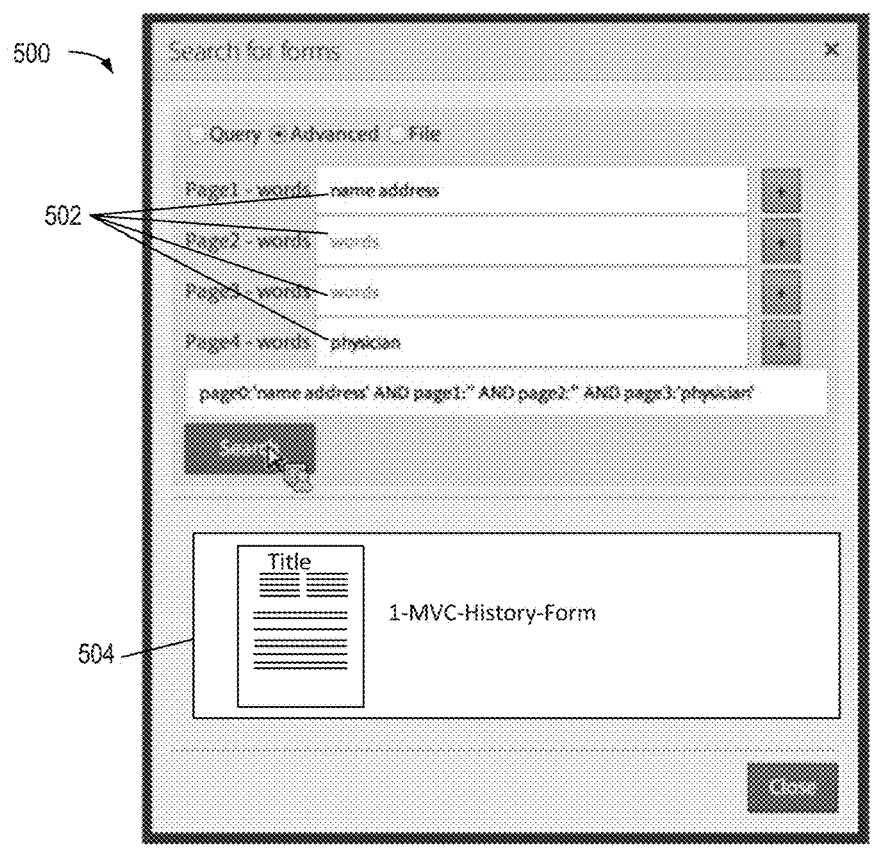
Figure 6:
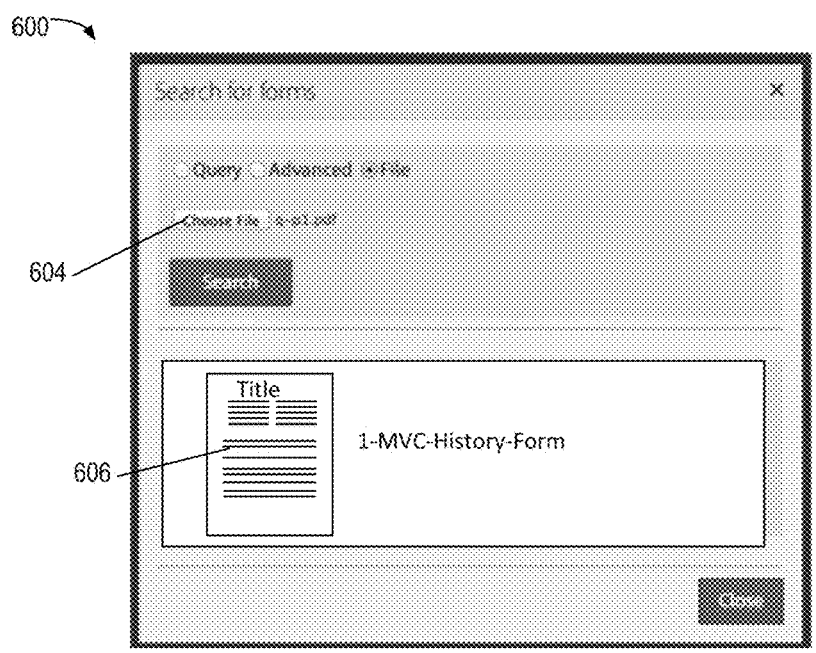

FIG. 2 is a block diagram illustrating exemplary modules for implementing functions in electronic form search server 102 of FIG. 1. Similar modules could additionally or alternatively be used in the local search and repository feature 114 of FIG. 1. The electronic form search server 102 includes modules 202, 204, and 206, which each are implemented by a processor executing stored computer instructions. Search input interface module 202 provides a user interface for entering search criteria and for viewing and interacting with search results. FIGS. 4-6 provide example search interfaces.

Search input recognition module 204 analyzes search input provided through a search interface to identify appropriate search criteria. In one example, text is received and the search input recognition module 204 identifies particular field characteristics that the text corresponds to for search purposes. For example, if a user enters "name" and "address" as search criteria the search input recognition module 204 may identify that those strings correspond to both field labels and field information types. In another example, an image is received and the search input recognition module 204 performs image recognition to identify fields and field characteristics.

Search engine module 206 performs the search to identify forms as search results. Such processing may involve comparing the search criteria to metadata stored for each of a plurality of potential form search results or involve using an index of information about stored forms. Searching may involve prioritizing potential search results with respect to how well each potential search result matches the search criteria. The characteristics of fields are used as the search criteria. In one embodiment, the characteristics are weighted based on historical results. For example, prior results may indicate that field layout is a better predictor of a form match then field boundary, and the search algorithm may account for this by weighting field layout more significantly than field boundary in the search.

Figure 3:
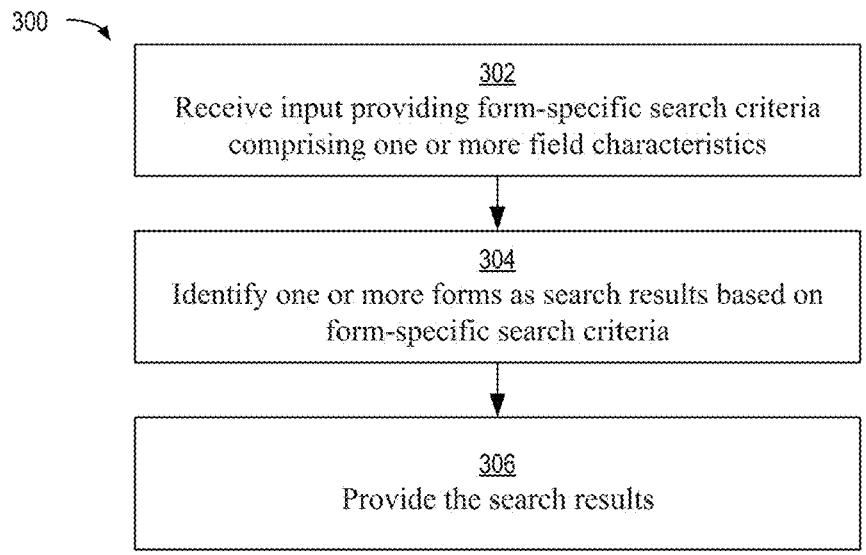
FIG. 3 is a flow chart of an exemplary method 300 for providing form search results in response to form-specific search criteria.

FIG. 3 is a flow chart of an exemplary method 300 for providing form search results in response to form-specific search criteria. Method 300 can be performed by server 102 of FIG. 1, local search and repository feature 114 of FIG. 1, or any other suitable device. Method 300 involves receiving input providing form-specific search criteria comprising one or more field characteristics, as shown in block 302. The one or more field characteristics include, but are not limited to, one or more of field locations, field layout, number of fields, field input type, field information type, field label, etc.

Receiving input providing form-specific search criteria can involve receiving input provided via a user interface. FIGS. 4-6 illustrate exemplary interfaces for receiving input used to identify field characteristics used as search criteria. In FIG. 4, the interface 400 includes an input box 402 for a user to enter text corresponding to specific field characteristics. In this example, "name" and "physician" may be matched with field characteristics (e.g., field information type and field label) of other forms. In FIG. 5, the interface 500 includes multiple input boxes 502 for each of multiple pages of a form. In this example, first page field characteristic values of "name" and "address" are specified and a fourth page field characteristic value of "physician" is specified.

FIG. 6 illustrates an interface 600 in which a "Choose file" option 504 is provided for a user to select an image file containing an image of an input form or portion thereof. For example, the user may identify a locally-stored file named "q-p1.pdf" that includes an image of a first page of a scanned or photographed form. In this example, the field characteristics used as the input search criteria can be identified from metadata of an image or based on an analysis of the image, e.g., using image recognition technology. Accordingly, one embodiment involves receiving input providing form-specific search criteria by receiving a scanned input image of an input form and automatically identifying the form-specific search criteria using image recognition. Image recognition can involve matching the shape of graphics identified on the form with shapes of graphics known to be associated with form fields. It can further involve recognizing text on the document and using the text to identify a nearby field or associating the text with a nearby field. The graphical appearance of a field and any nearby text may be used to infer characteristics of the field. For example, the substance of the nearby text, e.g., "first name," may be used as the field label and the field information type. As another example, the circular shape and small size relative to adjacent text of a graphical element may be used to infer that the element is a radio button of a field.

Referring again to FIG. 3, method 300 further involves identifying one or more forms as search results based on the form-specific search criteria, as shown in block 304. This involves comparing the input search criteria with field characteristics of one or more potential form search results. In one embodiment, field characteristics of a plurality of forms are stored at an electronic form search server, input is providing form-specific search criteria comprising field characteristics is received and the field characteristics of the form-specific search criteria are used to identify one or more forms from the plurality of forms as search results based on the one or more forms identified as search results having field characteristics similar to the field characteristics of the form-specific search criteria. In one example, this involves comparing field locations identified as search criteria with field locations within potential search result forms. The field locations may each comprise a vector representing a distance and direction to one or more points within the form. For example, each field may be associated with a vector that numerically describes the field's location with respect to a center point of the page on which the field appears. The vector may, but need not, also include information about the size of the field.

Searching for matching or similar forms can also involve comparing a number of fields identified as a search criteria with respective numbers of fields within potential search result forms, comparing a layout of fields identified as a search criteria with layouts of fields within potential search result forms, and/or comparing labels of fields identified as search criteria with labels of fields within potential search result forms. In general, individual field characteristics or combinations of field characteristics can be used in the search to identify search results. Accordingly, the search can involve comparing multiple field characteristics identified as search criteria with multiple field characteristics of fields within potential search result forms. The multiple field characteristics may include two or more of field location, field bounds, field label, field input type, and field information type. Searching for forms can also involve using weighted field characteristics in the searching. Such weighting can be determined based on a machine learning or other technique that accounts for the accuracy of prior search results.

In one embodiment, identifying the one or more forms as search results is based on the form-specific search criteria identifying a particular repository or repositories to be searched. As examples, an identified repository may be a public repository accessible through the Internet, a specified disk drive, or any other electronic document storage location.

In another embodiment, identifying the one or more forms as search results based on the form-specific search criteria comprises searching for completed forms based on search criteria specifying that search results should include only completed forms.

Method 300 next involves providing the search results, as shown in block 306. Search results can be provided in the form of a list, table, thumbnail representations, or any other format that identifies, provides information about the search results, or provides links of other access to the contents of the search results. In one embodiment, a search only finds a single best matching form and the search results are provided by identifying that best-matching form and/or providing a recommendation about how an input form used in identifying the search criteria can be modified based on the best matching form. For example, a recommendation may be provided to add drop down selections to a particular field based on corresponding field in the search result having the drop down selections. In this way, a recommendation can be provided to facilitate converting a static form into a live form with live-form field. Exemplary search results 404, 504, 604 are illustrated in FIGS. 4-6.

In one embodiment, identifying the one or more forms as search results is based on search criteria that indicates that the searcher would like to receive only live form search results containing one or more live-form fields.

Figure 7:
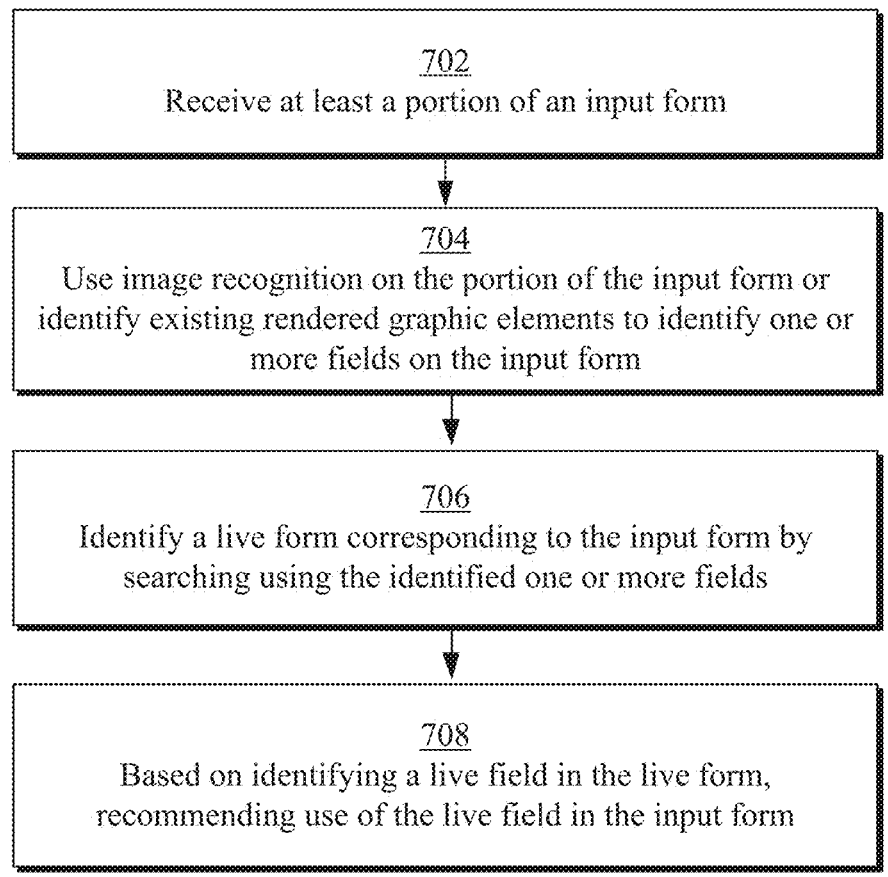
FIG. 7 is a flow chart of an exemplary method 700 for recommending a live field for use in an input form.

FIG. 7 is a flow chart of an exemplary method 700 for recommending a live field in an input form. Method 700 can be performed by server 102 of FIG. 1 or any other suitable device. Method 700 involves receiving at least a portion of an input form, as shown in block 702. For example, a user may scan a paper form and identify a pdf file that includes the scanned content. In another example, the user takes a picture of the first page of the paper document. In another example, the user retrieves the form in electronic form from an electronic storage location.

Method 700 further involves using image recognition on the portion of the input form or identifying existing rendered graphic elements to identify one or more fields, as shown in block 704. This can involve matching the shape of graphics identified on the form with shapes of graphics known to be associated with form fields.

In one embodiment, identifying the one or more fields involves image recognition. In this example, such recognition involves comparing pixels of a portion of the image to identify matches with one or more known field pixel formations. Recognizing fields based on image recognition can further involve recognizing text on the document and using the text to identify a nearby field or associating the text with a nearby field. The graphical appearance of a field and any nearby text may be used to infer characteristics of the field. For example, the substance of the nearby text. e.g., "first name," may be used as the field label and the field information type. As another example, the circular shape and small size relative to adjacent text of a graphical element may be used to infer that the element is a radio button of a field.

In one embodiment, identifying the one or more fields involves using existing rendered graphical elements in the document, such as graphics lines and curves. Accordingly, in this embodiment, rather than interpreting the pixels of the input form to recognize the shapes, the shapes are identified because they are defined in the document. For example, a PDF has graphic lines and curves which give the appearance of form fields yet do not actually contain any information (beyond a visual indicator) that form fields are present in the document. These shapes can be interpreted alone (or in combination with other nearby shapes and/or text) to identify the one or more fields.

Method 700 further involves identifying a live form corresponding to the input form by searching using the identified one or more fields of the input form, as shown in block 706. Searching can be performed as described with respect to other embodiment disclosed herein and may be limited to potential form search results that are labelled as "live" or for which metadata otherwise indicates that the forms include live fields.

Method 700 next involve, based on identifying the live field in the live form, recommending use of the live field in the input form, as shown in block 706. In one embodiment this involves presenting the input form adjacent to the live form so that the user can easily see and compare the corresponding fields and use the live field as an example for modifying the input form. In another embodiment, the recommendation comprises a particular notification such as a message asking whether the user would like for the interface to automatically modify one or more of the fields in the input form with the structure and metadata associated with the fields in the live document. Additional or alternative recommendation formats and interfaces can be used.

Another exemplary embodiment allows a user to find versions of forms with additional or better form information in the form. One can think of a hierarchy of how much explicit information is available in a given version of a form. At the low end of the hierarchy are paper and electronic, image-only versions that do not contain any information about form fields or the text or graphical elements on the form. Such versions are essentially limited to pixel or image information. Second in the hierarchy are text only files which, for example, use ASCII art to represent fields (e.g., "_____", "|_|_|_|", etc.) Third in the hierarchy are files containing text and rendered graphics (such as lines and curves), but that lack any explicit definition of form fields. Finally, fourth on the hierarchy, are files containing explicitly defined, or "live", form fields.

Embodiments disclosed herein allow a version of a form that is lower in the hierarchy to be used to search for one or more other versions of the form that are higher in the hierarchy. By identifying a version of a form that is higher in the hierarchy a user may have an improved ability to automatically identify form fields. For example, a user may use a PDF that is merely a scan and identify a PDF that contains graphics which visually represent, but do not explicitly define, form fields. This better version can then be automatically interpreted (more easily and more efficiently than the original scan version) to identify the form fields. Thus, in one embodiment, a user provides an image file as input, and is able to locate the original PDF or Word file that, while it does not contain live form fields, contains rendered text and graphics (as opposed to image only) which will be much more successful in automatic form field detection due to the more explicit nature of its content (as opposed to images which are by definition completely implicit as to the meaning of the image). Note that this technique applies in both the case of a user attempting to identify or create a version of a form with live fields and also in the case of a user seeking forms which are a superior to image-only representations.

Exemplary Computing Environment

Figure 8:
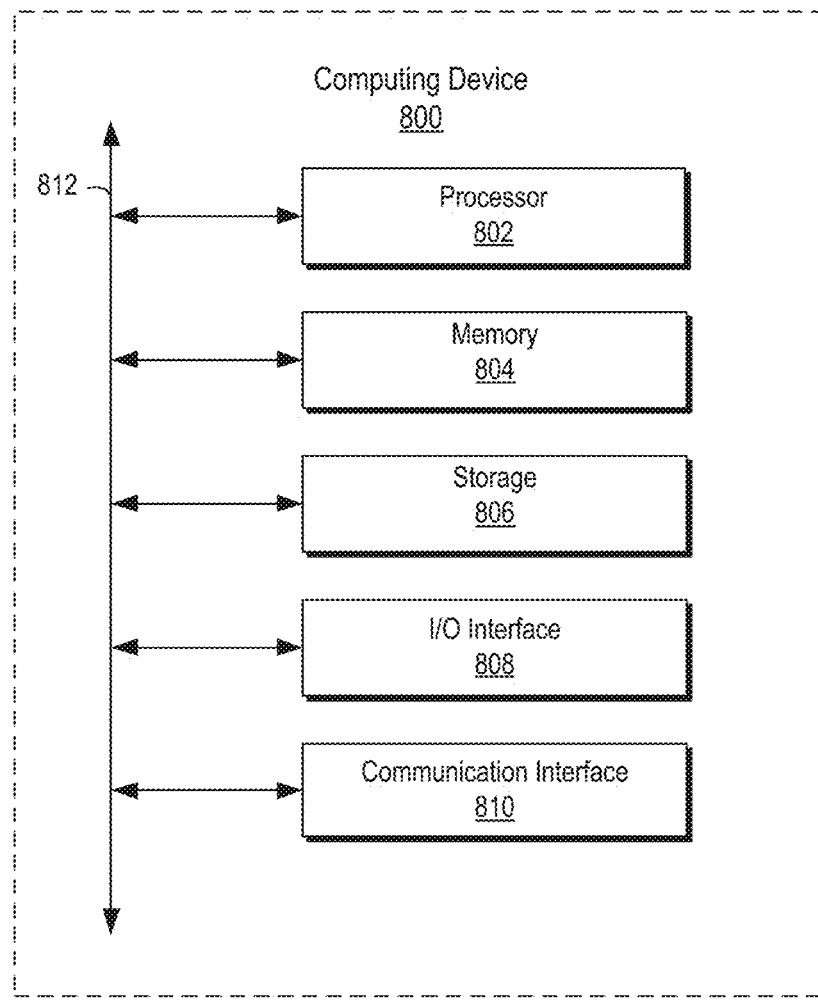
FIG. 8 is a block diagram depicting example hardware implementations for the components described in FIG. 1.

Any suitable computing system or group of computing systems can be used to implement the computer devices of FIG. 1 or otherwise used to implement the techniques and methods disclosed herein. For example, FIG. 8 is a block diagram depicting examples of implementations of such components. The computing device 800 can include a processor 802 that is communicatively coupled to a memory 804 and that executes computer-executable program code and/or accesses information stored in the memory 804 or storage 806. The processor 802 may comprise a microprocessor, an application-specific integrated circuit ("ASIC"), a state machine, or other processing device. The processor 802 can include one processing device or more than one processing device. Such a processor can include or may be in communication with a computer-readable medium storing instructions that, when executed by the processor 802, cause the processor to perform the operations described herein.

The memory 804 and storage 806 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 800 may also comprise a number of external or internal devices such as input or output devices. For example, the computing device is shown with an input/output ("I/O") interface 808 that can receive input from input devices or provide output to output devices. A communication interface 810 may also be included in the computing device 800 and can include any device or group of devices suitable for establishing a wired or wireless data connection to one or more data networks. Non-limiting examples of the communication interface 810 include an Ethernet network adapter, a modem, and/or the like. The computing device 800 can transmit messages as electronic or optical signals via the communication interface 810. A bus 812 can also be included to communicatively couple one or more components of the computing device 800.

The computing device 800 can execute program code that configures the processor 802 to perform one or more of the operations described above. The program code can include one or more of the modules of FIG. 2. The program code may be resident in the memory 804, storage 806, or any suitable computer-readable medium and may be executed by the processor 802 or any other suitable processor. In some embodiments, modules can be resident in the memory 804.

In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. In a computer network environment, a method for retrieving higher-quality form versions for data entry responsive to search queries with lower-quality form versions, the method comprising:
  storing, at an electronic form search server, a plurality of electronic forms and stored form data identifying, for each form, locations of fields in the form and a layout of the fields in the form, wherein the plurality of electronic forms includes a target form having fields configured data entry;
  receiving, at the electronic form search server, a search input that includes a lower-quality version of the target form, the lower-quality version of the target form lacking one or more of the fields configured for data entry from the target form;
  deriving, by the electronic form search server and from data in the lower-quality version of the target form, field locations in the lower-quality version of the target form and a layout of fields in the lower-quality version of the target form;
  matching, by the electronic form search server, the field locations and the layout of fields in the lower-quality version of the target form to corresponding field locations and a corresponding layout of fields in the target form as stored at the electronic form search server; and
  providing, by the electronic form search server, the target form in search results responsive to the search input, wherein the target form has a higher quality as compared to the lower-quality version of the target form.

2. The method of claim 1 wherein each of the field locations comprises a respective vector representing a respective distance and direction to a respective set of one or more points within the form.

3. The method of claim 1, further comprising selecting the target form from the electronic form search server based on comparing a number of fields identified as a search criteria with respective numbers of fields within potential search result forms.

4. The method of claim 1, further comprising selecting the target form from the electronic form search server based on comparing field-specific search criteria with field specific metadata from within potential search result forms.

5. The method of claim 1, further comprising selecting the target form from the electronic form search server based on comparing labels of fields identified as search criteria with labels of fields within potential search result forms.

6. The method of claim 1, further comprising selecting the target form from the electronic form search server based on multiple field characteristics identified as search criteria with multiple field characteristics of fields within potential search result forms, wherein the multiple field characteristics comprise two or more field location, field bounds, field label, field input type, field information type.

7. The method of claim 6, further comprising weighting the multiple field characteristics based on historical search results.

8. The method of claim 1 wherein receiving the search input comprises:
  receiving an input image of an input form; and
  identifying, from metadata of the input image, one or more of the locations of fields in the form and a layout of the fields in the form.

9. The method of claim 1 wherein receiving the search input comprises:
  receiving a scanned input image of an input form; and
  automatically identifying one or more of the locations of fields in the form and a layout of the fields in the form using image recognition.

10. The method of claim 1, wherein receiving the search input comprises:
  receiving a derived format of an input form; and
  automatically identifying one or more of the locations of fields in the form and a layout of the fields in the form using graphic and text recognition.

11. The method of claim 1, further comprising selecting the target form from the electronic form search server based on the search input including search criteria specifying that search results should include only live-field forms.

12. The method of claim 1, further comprising selecting the target form from the electronic form search server based on the search input including search criteria specifying that search results should include only completed forms.

13. In a computer network environment, a method for providing suggestions for changing an input form, the method comprising a server;
  receiving a search input a portion of an input form that is a lower-quality version of a live form, wherein the live form is stored on an electronic form search server and has fields configured for data entry, wherein the portion of the input form lacks one or more of the fields configured for data entry;
  identifying existing rendered graphic elements of the input form by applying an image recognition process to the portion of the input form;
  deriving, from the existing rendered graphic elements, (i) locations of fields on the input form and (ii) a layout of fields in the input form;
  matching the live form stored at the electronic form search server to the input form by searching stored forms based on (i) the locations of the fields or (ii) the layout of fields;
  based on identifying a live field in the live form, recommending a change to input data in a non-live field in the input form to correspond to data in the live field; and
  identifying the live form in search results responsive to the search input.

14. A system comprising:
  a form repository comprising a non-transitory computer-readable medium having a data structure that stores a plurality of electronic forms and stored form data identifying, for each form, locations of fields in the form and a layout of the fields in the form, wherein the plurality of electronic forms includes a target form having fields configured for data entry; and
  an electronic form server communicatively coupled to the form repository and a client device, wherein the electronic form server comprises a processing device configured for performing operations comprising:
    receiving, from the client device, a search input that includes a lower-quality version of the target form, the lower-quality version of the target form lacking one or more of the fields configured for data entry from the target form,
    deriving, from data in the lower-quality version of the target form, at least one of (i) a set of field locations in the lower-quality version of the target form or (ii) a layout of fields in the lower-quality version of the target form,
    matching the at least one of (i) the set of field locations or (ii) the layout of fields derived from the lower-quality version of the target form to at least one of (i) a corresponding set of field locations in the target form or (ii) a corresponding layout of fields in the target form, and
    transmitting the target form to the client device.

15. The system of claim 14, wherein each field location of the set of field locations comprises a respective vector representing a respective distance and direction to a respective set of one or more points within the form.

16. The system of claim 14, the operations further comprising retrieving the target form from the form repository based on comparing a number of fields identified as a search criteria with respective numbers of fields within potential search result forms.

17. The system of claim 14, the operations further comprising retrieving the target form from the form repository based on comparing labels of fields identified as search criteria with labels of fields within potential search result forms.

18. The system of claim 14 wherein receiving the search input comprises:

receiving an input image of an input form; and identifying, from metadata of the input image, one or more of the locations of fields in the form and a layout of the fields in the form.

19. The system of claim 14, wherein receiving the search input comprises:

receiving a scanned input image of an input form; and automatically identifying one or more of the locations of fields in the form and a layout of the fields in the form using image recognition.

20. The system of claim 14, the operations further comprising retrieving the target form from the form repository based on the search input including search criteria specifying that search results should include only live-field forms.

21. The system of claim 14, the operations further comprising retrieving the target form from the form repository based on the search input including search criteria specifying that search results should include only completed forms.

* * * * *